United States Patent [19]

Mitchell et al.

[11] Patent Number: 4,730,409
[45] Date of Patent: Mar. 15, 1988

[54] FISHING LINE APPARATUS

[76] Inventors: Ernest M. Mitchell, 2943 W. 66th St., Tulsa, Okla. 74132; Stanley W. Wilcox, 4187 S. St. Louis, Tulsa, Okla. 74105

[21] Appl. No.: 844,692

[22] Filed: Mar. 27, 1986

[51] Int. Cl.⁴ .............................................. A01K 87/00
[52] U.S. Cl. ....................................... 43/25; 43/25.2; 30/296 R
[58] Field of Search .......................... 43/25, 4; 7/106; 43/25.2; 30/296 R

[56] References Cited

U.S. PATENT DOCUMENTS 2,561,289  7/1951  Paris ................................... 30/296 R
3,927,488 12/1975  Peddy ..................................... 43/25

FOREIGN PATENT DOCUMENTS 626169 12/1926  France ................................... 30/298

Primary Examiner—Nicholas P. Godici
Assistant Examiner—Karen Skillman
Attorney, Agent, or Firm—Robert B. Stevenson

[57] ABSTRACT

A multipurpose fishing line aid apparatus comprising a tubular means having a longitudinal opening along one side that reversibly snaps on and off of a fishing pole and a pair of substantially flat coplanar superimposed surfaces with a notch and razor blade cutting edge sandwiched therebetween attached to the opposite side relative to the longitudinal opening of the tubular means. The pair of surfaces can be further equipped with at least one extension located in the region of attachment to the tubular means and colinear to the longitudinal opening and extending beyond the tubular means as well as at least one circular recess for positioning an eyelet to assist threading a fishing line through the eyelet. Such a multipurpose fishing accessory is useful to restrain a line during winding, threading a line through small eyelets, holding the line during attachment or replacement of lures, hooks and the like, cutting the line, holding or anchoring hooks and lures and vertically hanging the fishing rod during storage.

5 Claims, 8 Drawing Figures

FISHING LINE APPARATUS

BACKGROUND OF THE INVENTION

1. Field of the Invention:

This invention relates to a fishing line apparatus. More specifically, the invention relates to a multipurpose fishing line cutter.

2. Description of the Prior Art

It is generally known and recognized that the use of a fishing pole, line and tackle frequently involves a variety of tools and apparatus to aid in accomplishing certain tasks. Thus, various methods and devices have been historically suggested for restraining or holding the line when winding on a new one, threading line through small eyelets, clasping the line for attaching lures and hooks, cutting the line for removing or replacing lures, hooks or the like, holding or anchoring the hooks or lures and vertically hanging the rod. However, prior to the present invention, no single apparatus or fishing accessory accomplishes all of the above.

SUMMARY OF THE INVENTION

The present invention provides a multipurpose fishing line aid comprising:

(a) a tubular means having a longitudinal opening along one side for reversibly snapping on and off of a fishing pole;

(b) a pair of substantially flat coplanar, superimposed surfaces attached to the tubular means opposite the longitudinal opening and extending essentially radially outward, wherein the outer edge of each of the surfaces has a recess extending inwardly towards the tubular means; and (c) a cutting edge operatively positioned between the pair of surfaces such that the cutting edge is exposed only within the recess below the outer edge of the surfaces.

In one embodiment of the present invention, the pair of surfaces is further characterized by at least one extension, located near the region of attachment to the tubular means and colinear to the longitudinal opening and wherein the extension extends beyond the tubular means.

In another embodiment of the present invention, the pair of surfaces is further characterized by sufficient spacing between the surfaces near the region of attachment to the tubular means that a fishing line will enter and be held therebetween.

In another embodiment of the invention, the outer perimeter of the surfaces further comprises at least one circular recess means for positioning an eyelet to assist in threading a fishing line through the eyelet.

It is a primary object of the present invention to provide a fishing line aid apparatus that is multipurpose in that it accomplishes a plurality of functions. It is a further object of the present invention to provide such a device or apparatus that can be readily snapped on or off of a conventional fishing pole. It is still a further object of the present invention to provide such a fishing line aid apparatus that will readily anchor a fishing line and provide a cutting edge. Fulfillment of these objects and the presence and fulfillment of additional objects will be apparent upon complete reading of the specification and claims taken in conjunction with the attached drawings.

DESCRIPTION OF THE PREFERRED EMBODIMENTS

Figure 1:
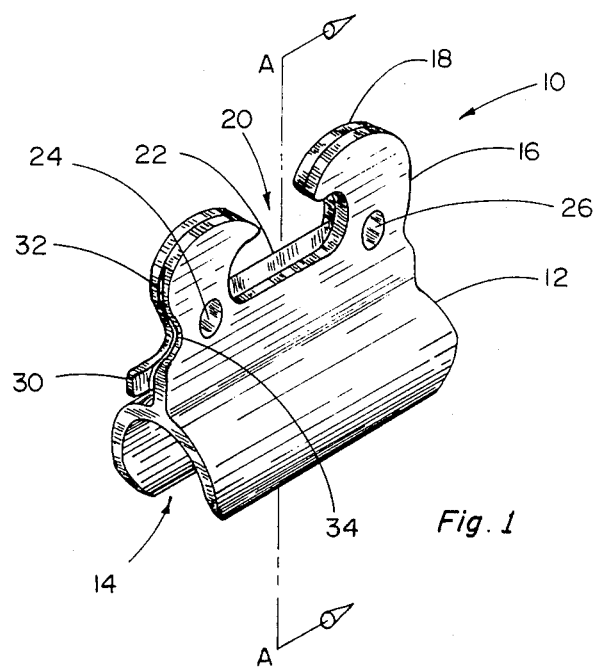
FIG. 1 is a perspective view of one embodiment of the fishing line aid apparatus according to the present invention.

The multipurpose fishing line aid apparatus according to the present invention, how it functions and operates and how it is made and used as well as how it differs from and the advantages over the prior art devices can perhaps be best explained and understood by reference to the drawings. FIG. 1 illustrates one particularly preferred embodiment of the fishing line aid apparatus, generally designated by the numeral 10. As illustrated, the device comprises a tubular member 12 having a longitudinal opening 14 along the underside which is properly sized to reversibly snap on and off of a conventional fishing pole (not shown). Extending radially upward from the top of the tubular member 12 are a pair of substantially flat coplanar, superimposed surface members 16 and 18. On the outer edge of each member 16 and 18 is a recess 20 that exposes the cutting edge of a razor blade 22 sandwiched between the members 16 and 18.

Figure 2:
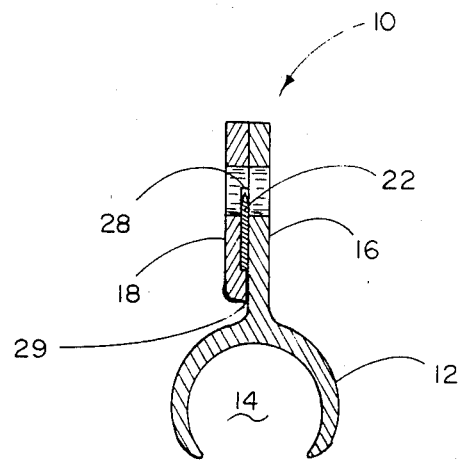
FIG. 2 is a cross-sectional view of the fishing line aid apparatus of FIG. 1 as seen through line A—A.

As further illustrated in FIGS. 1 and 2, the surface member 16 in this specific embodiment is integrally attached to the tubular member 12. This can be accomplished by any conventional method as generally known in the art, including by way of example but not limited thereto, as a single extruded profile or molded as a single unit. The second flat member 18 is attached to the first member 16 by pins 24 and 26 which advantageously can be detachable (snap fasteners) or permanently riveted together, depending on whether or not the razor blade 22 is intended to be replaceable.

Also, the pin fasteners 24 and 26 and the flat members 16 and 18 are advantageously assembled such as to allow the fishing line to slip between members 16 and 18 at the bottom crack 29. In this manner, the fishing line can be wedged between members 16 and 18 near the junction of attachment to the tubular member 12 and be held or anchored therebetween. By doing so, the user's hands are freed to perform other tasks as described later.

As seen in FIG. 2, a small recess 28 in the form of a segmented channel or groove conforming to the shape of the razor blade 22 is provided on the inner side of the flat surface 18 to accommodate and hold the razor blade in place while exposing the cutting edge only within the recess 20. In this manner, the cutting edge is shielded from the user, thus reducing the risk of accidentally cutting when not desired In other words, by recessing the cutting edge of the razor blade, the fishing line must be intentionally directed into opening 20 in order for the line to be cut.

The apparatus 10 is also provided with an extension of the lower portion of surface 18 near the point of attachment to tubular member 12, thus forming a tab 30. The inner edges of members 16 and 18 in the region slightly above the tab 30 are beveled or chamfered to produce a V-shaped groove 32 therebetween. And, the V-shaped groove 32 is intentionally directed along a region of surfaces 16 and 18 that has a reverse curvature 34 present, all of which lend to the multifunctional character of the fishing line aid apparatus 10 as explained later.

Figure 4:
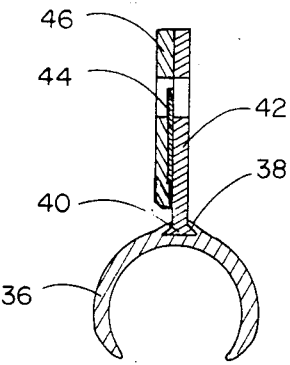
FIG. 4 is an end view of the alternate embodiment of FIG. 3 when assembled.
Figure 3:
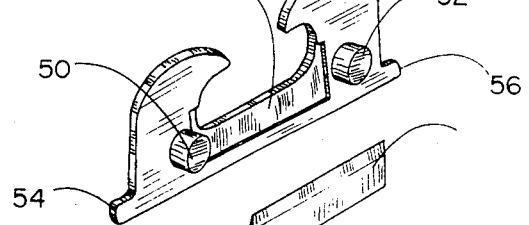
FIG. 3 illustrates an alternate embodiment of the fishing line aid apparatus according to the present invention when disassembled.
Figure 3:
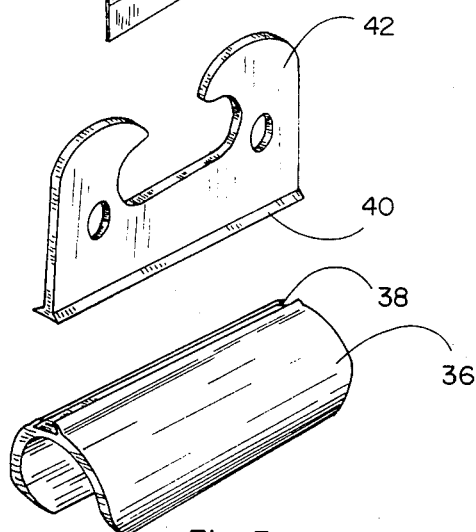

FIGS. 3 and 4 illustrate another specific embodiment of the fishing line aid apparatus according to the present invention. In this embodiment, the top side of the tubular member 36 contains an undercut groove or channel 38 that accepts and retains the lower bellowed portion 40 of flat member 42 when the apparatus is assembled (see FIG. 4). In this manner, various sizes of tubular members 36 corresponding to different fishing pole dimensions or the like can be employed with a single razor blade 44 and holding surface 46 in that member 42 can be selectively withdrawn from one tubular member on one fishing pole and slide onto another. It should be appreciated that the tong and groove relationship specifically illustrated in FIGS. 3 and 4 can be readily inverted with the channel or sleeve member being molded into the vertical flat member and a compatible sliding insert profile be provided on the tubular member. Such a reversibly attachable system or configuration should also be considered equivalent for purposes of this invention.

As further illustrated in this specific embodiment, the second flat member 46 reversibly snaps together with member 42 while holding razor blade 44 in recess 48 located between pins 50 and 52 in the assembled state. The embodiment of FIGS. 3 and 4 also contains a pair of tab members 54 and 56, one on each end of member 46, the purpose for which will be explained later.

Figure 5:
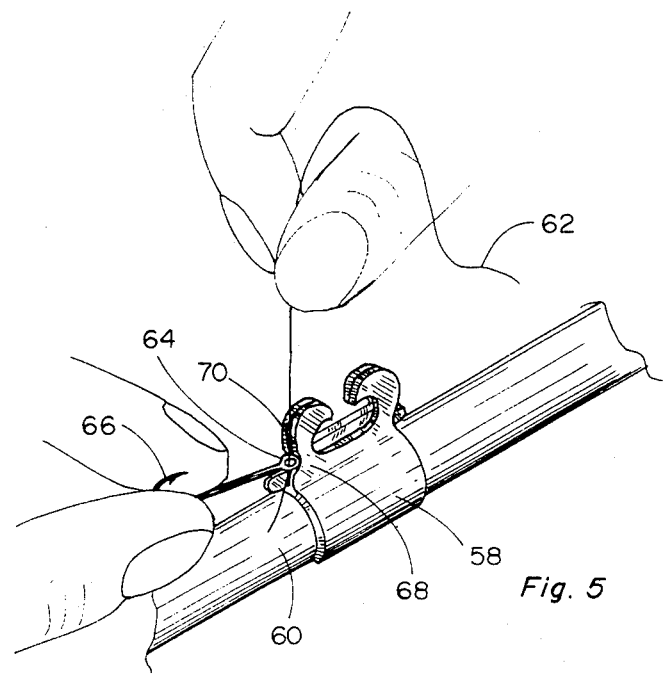
FIG. 5 illustrates the fishing line aid apparatus according to the present invention being used to assist in threading the fishing line through an eyelet of a fishing hook.

As previously indicated, the fishing line aid apparatus according to the present invention is a multipurpose device that snaps on and off of a conventional fishing pole. When appropriately positioned on the fishing pole, the device can be used in a variety of ways. For example, and as illustrated in FIG. 5, the fishing line aid 58 snapped onto pole 60 can be used to assist the threading of line 62 through the small eyelet 64 of the fish hook 66. In order to do this, the fish hook 66 is simply held such that the eyelet 64 is positioned in the recess of the reverse curvature 68 while the end of the fishing line 62 is directed along the V-shaped groove 70 and through the eyelet 64.

Figure 6:
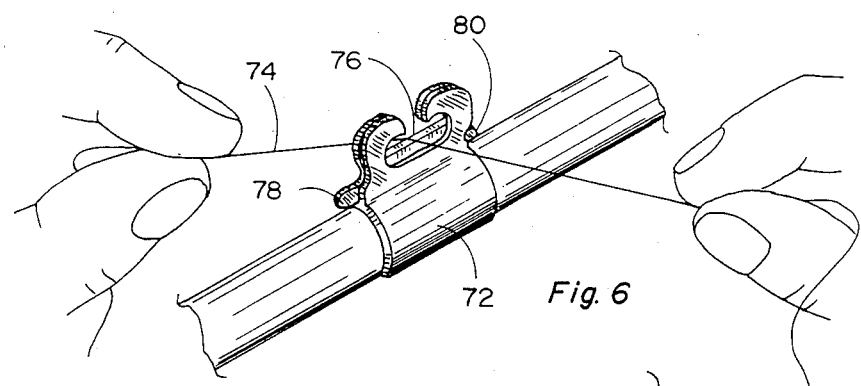
FIG. 6 illustrates the fishing line aid apparatus according to the present invention being used to assist in holding and cutting the fishing line.

As further illustrated in FIG. 6, a line aid 72 can be used to restrain and clasp the fishing line 74 for severing the line with the protected blade 76. This is accomplished by wrapping the line 74 around the line aid 72 under the tabs 78 and 80 at each end of the line aid 72 or by wedging the fishing line under and between the flat members as described in FIG. 8. This then frees the user's hands to put tension on the fishing line 74 and cut the line using the razor blade 76. Similarly, the device can be used to restrain the line when winding in a new line or to clasp the line for attaching lures or hooks and the like.

Figure 7:
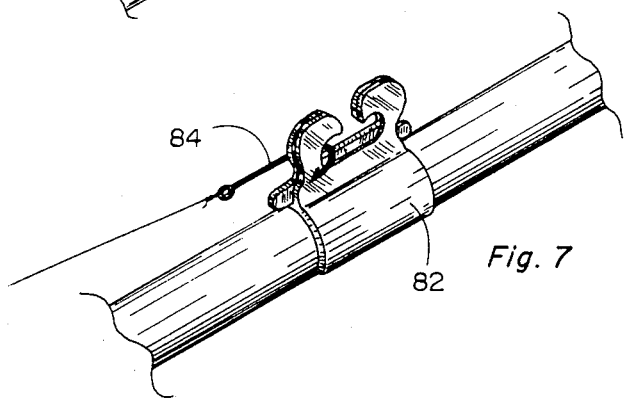
FIG. 7 illustrates the fishing line aid apparatus according to the present invention being used to hold and retain a fishing hook.

As illustrated in FIG. 7, the line aid 82 can also be used to anchor the fishing hook 84 or lures and the like. Also, the device can be used to hang the fishing rod vertically when the rod is not in use (not shown).

Figure 8:
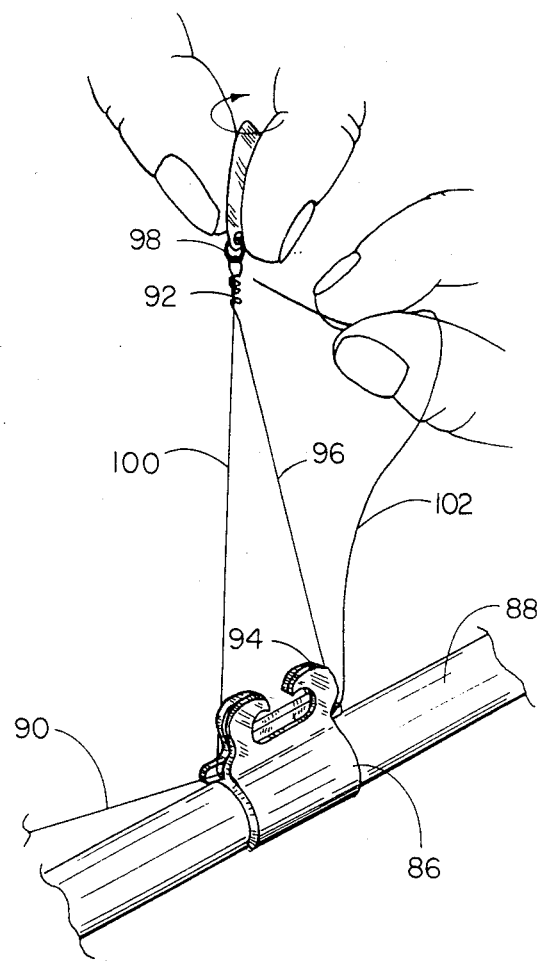
FIG. 8 illustrates the fishing line aid apparatus according to the present invention being used to hold and retain a monofilament fishing line while tying a monofilament knot.

FIG. 8 illustrates the use of the fishing line aid according to the present invention to assist in tying a knot in a monofilament fishing line. As illustrated, the line aid 86 mounted to fishing pole 88 can be used to anchor and hold both ends of the monofilament line 90 while tying a knot 92. This is accomplished by first slipping line 90 under the shorter of the two flat surfaces 94 and pulling the line such that it wedges securely between two surfaces. The end 96 of line 90 is then threaded through the eyelet 98 and looped back 100 under the flat surface member 94 for a second time. To tie the knot, the eyelet is twisted several revolutions as indicated by the curved arrow in FIG. 8 and the loose end 102 of the fishing line slipped through the open loop nearest the eyelet and then back through the loop created by line segments 100 and 102. The fishing line is then removed from the line aid 86 and the knot is pulled taut. Thus as illustrated, the line aid will conveniently hold and retain both sides of a monofilament line as it is tied to a lure, swivel, hook or the like. Similarly, the line aid can be used to apply tension and anchor two monofilament lines that are being tied or spliced together by the so-called blood knot or the like.

The actual construction and fabrication of the line aid apparatus according to the present invention can be out of any material generally known in the art, including by way of example, but not limited thereto, plastics, reinforced plastics, various metals and the like. Preferably, the line aid is fabricated out of a plastic such as nylon, polyvinyl chloride, polyolefins such as polyethylene and/or polypropylene, polycarbonates, polyamides, various polystyrene based polymers such as crystalline polystyrene, impact polystyrene and/or ABS, polyesters or the like. Advantageously, the portion of the line aid that snaps on and off of the fishing pole is fabricated out of a flexible polymer such as nylon or other related polyamides, polyolefins such as polypropylene or polycarbonates, while the portion of the line aid containing the rivet or attachment post can be advantageously fabricated out of a polymer that can be cold pressed, melt sealed or solvent sealed such as PBC, ABS, crystal polystyrene or the like.

One particular preferred method of constructing and fabricating the line aid apparatus according to the present invention is to mold the tubular means and attached flat surface extending radially therefrom out of nylon. In this manner, the apparatus takes advantage of the flexibility of nylon to facilitate snapping the line aid on and off of the fishing pole. In this particularly preferred embodiment, the other substantially flat, coplanar member to be superimposed on the first flat surface is molded out of PVC with two PVC pins extending perpendicular to the surface for fastening through the holes in the first nylon surface member. It has been found that PVC pins that intentionally extend through and beyond the nylon surface can be cold pressed (e.g., displaced about 0.010 inch) during assembly of the two superimposed surfaces that hold the razor blade such as to form plastic rivets with cold pressed heads that hold together the entire line aid apparatus. Preferably, when fabricating the line aid apparatus out of plastic components as described in the above particularly preferred embodiment, the lower edges of the smaller flat member is curved, tapered or beveled and the plastic flashing at the lower inner edge is struck off before assembly to insure that the monofilament line can readily be reversibly anchored between the two surfaces such as illustrated in FIG. 8.

Having thus described the invention with a certain degree of particularity, it is manifest that many changes can be made in the details of the invention without departing from the spirit and scope of the invention. Therefore, it is to be understood that the invention is not limited to the embodiments set forth herein for purposes of exemplification, but is to be limited only by the scope of the attached claims, including a full range of equivalents to which each element thereof is entitled.

We claim:

1. A multipurpose fishing line and apparatus comprising:
   (a) a tubular means having a longitudinal opening along one side for reversibly snapping on and off of a fishing pole;
   (b) a pair of substantially flat coplanar, superimposed members attached to said tubular means opposite said longitudinal opening and extending essentially radially outward, wherein the outer edge of each of said members has a recess extending inwardly towards said tubular means; and
   (c) a cutting edge operatively positioned between said pair of members such that said cutting edge is exposed only within said recess below the outer edge of said surfaces, wherein at least one of said pair of substantially flat coplanar, superimposed members is further characterized by at least one extension, located near the region of attachment to said tubular means and colinear to the longitudinal opening and wherein said extension extends beyond said tubular means.

2. A multipurpose fishing line aid apparatus comprising:
   (a) a tubular means having a longitudinal opening along one side for reversibly snapping on and off of a fishing pole;
   (b) a pair of substantially flat coplanar, superimposed members attached to said tubular means opposite said longitudinal opening and extending essentially radially outwrad, wherein the outer edge of each of said members has a recess extending inwardly towards said tubular means; and
   (c) a cutting edge operatively positioned between said pair of members such that said cutting edge is exposed only within said recess below the outer edge of said surfaces, wherein the outer perimeter of said pair of substantially flat coplanar, superimposed members further comprises at least one circular recess means for positioning an eyelet ot assist in threading a fishing line through said eyelet.

3. A multipurpose fishing line aid apparatus comprising:
   (a) a tubular means having a longitudinal opening along one side for reversibly snapping on and off of a fishing pole;
   (b) a pair of substantially flat coplanar, superimposed members attached to said tubular means opposite said longitudinal opening and extending essentially radially outward, wherein the outer edge of each of said members has a recess extending inwardly towards said tubular means; and
   (c) a cutting edge operatively positioned between said pair of members such that said cutting edge is exposed only within said recess below the outer edge of said surfaces, wherein said pair of substantially flat coplanar, superimposed members is further characterized by sufficient spacing therebetween near the attachment to said tubular means such as to allow a fishing line to be wedged and held therebetween.

4. A multipurpose fishing line aid apparatus of claim 3 wherein said pair of substantially flat coplanar, superimposed members consist of a first substantially flat member being integrally attached to said tubular means as a single molded plastic component having a pair of holes therein adapted to receive plastic pins attached to said other second, substantially flat member and a second substantially flat member having a pair of pins integrally attached thereto as a single molded plastic component wherein said pins are adapted to fasten to said holes in said first substantially flat member.

5. A multipurpose fishing line aid apparatus of claim 4 wherein said first substantially flat member is fabricated out of nylon and said second substantially flat member is fabricated out of polyvinyl chloride.

* * * * *